(12) United States Patent
Reynier et al.

(10) Patent No.: US 10,897,854 B2
(45) Date of Patent: Jan. 26, 2021

(54) SLOW RATE LIQUID-DISPENSING DEVICE FOR ARBORICULTURE AND VITICULTURE

(71) Applicant: Christophe De Mil, Paris (FR)

(72) Inventors: Arnaud Reynier, Marseilles (FR); Sylvain Reynier, Vitrolles (FR)

(73) Assignee: Christophe De Mil, Paris (FR)

( * ) Notice: Subject to any disclaimer, the term of this patent is extended or adjusted under 35 U.S.C. 154(b) by 70 days.

(21) Appl. No.: 15/742,314

(22) PCT Filed: Jul. 6, 2016

(86) PCT No.: PCT/FR2016/000115
§ 371 (c)(1),
(2) Date: Jan. 5, 2018

(87) PCT Pub. No.: WO2017/005994
PCT Pub. Date: Jan. 12, 2017

(65) Prior Publication Data
US 2018/0192594 A1    Jul. 12, 2018

(30) Foreign Application Priority Data
Jul. 8, 2015    (FR) ...................................... 15 01444

(51) Int. Cl.
*A01G 7/06* (2006.01)
*A01G 17/02* (2006.01)

(52) U.S. Cl.
CPC .............. *A01G 7/06* (2013.01); *A01G 17/02* (2013.01)

(58) Field of Classification Search
CPC .................................. A01G 7/06; A01G 29/00

USPC .......................................................... 47/57.5
See application file for complete search history.

(56) References Cited

U.S. PATENT DOCUMENTS

| 952,245 | A | * | 3/1910 | Gardner | ................... | A01G 7/06 |
| | | | | | | 47/57.5 |
| 3,124,904 | A | * | 3/1964 | Mauget | ................... | A01G 7/06 |
| | | | | | | 47/57.5 |
| 3,130,519 | A | * | 4/1964 | Mauget | ............... | B65D 83/306 |
| | | | | | | 47/57.5 |
| 3,286,401 | A | * | 11/1966 | Mauget | ................... | A01G 7/06 |
| | | | | | | 47/57.5 |
| 3,295,254 | A | * | 1/1967 | Schoonman | ............. | A01G 7/06 |
| | | | | | | 47/57.5 |
| 3,915,212 | A | * | 10/1975 | Bujan | ....................... | A61J 1/10 |
| | | | | | | 604/408 |

(Continued)

FOREIGN PATENT DOCUMENTS

CN    203735133 U    7/2014
FR    2839851 A1    11/2003

(Continued)

OTHER PUBLICATIONS

International Search Report for PCT/FR2016/000115, dated Oct. 21, 2016.

*Primary Examiner* — Monica L Barlow
*Assistant Examiner* — Michael A. Fabula
(74) *Attorney, Agent, or Firm* — Sughrue Mion, PLLC

(57) ABSTRACT

A dispenser device for dispensing a liquid, the device including a container 20 that communicates with a needle 23 attached to its bottom, the needle projecting to the outside of the container. The container is provided with at least one flexible tab 24 for fastening it.

10 Claims, 4 Drawing Sheets

(56) References Cited

U.S. PATENT DOCUMENTS

| | | | | |
|---|---|---|---|---|
| 3,920,393 A * | 11/1975 | Baynes | B27K 3/105 | 427/291 |
| 3,992,813 A * | 11/1976 | Freshel | A01C 21/00 | 47/57.5 |
| 4,028,846 A * | 6/1977 | Floyd | A01G 7/06 | 47/57.5 |
| 4,144,673 A * | 3/1979 | Quast | A01G 7/06 | 211/107 |
| 4,248,223 A * | 2/1981 | Turner | A61M 5/36 | 604/122 |
| 4,989,366 A * | 2/1991 | DeVlieger | A01G 7/06 | 47/57.5 |
| 5,031,357 A * | 7/1991 | Macbeth | A01G 7/06 | 47/57.5 |
| 5,239,773 A * | 8/1993 | Doolittle, Jr. | A01G 29/00 | 47/57.5 |
| 5,249,391 A * | 10/1993 | Rodgers | A01G 7/06 | 47/57.5 |
| 5,355,619 A * | 10/1994 | West | A01G 7/06 | 47/48.5 |
| 5,355,620 A * | 10/1994 | Newbanks | A01G 7/06 | 47/57.5 |
| 5,477,638 A * | 12/1995 | Corradi | A01G 7/06 | 47/57.5 |
| 5,553,416 A * | 9/1996 | Jasso, Jr. | A01G 29/00 | 220/3.2 |
| 5,797,215 A * | 8/1998 | Doolittle | A01G 7/06 | 47/57.5 |
| 6,032,411 A * | 3/2000 | Foust | A01G 7/06 | 47/57.5 |
| 6,216,388 B1 * | 4/2001 | Miller | C05G 5/45 | 47/57.5 |
| 6,360,479 B1 * | 3/2002 | Webb | A01H 3/04 | 47/57.5 |
| 6,599,273 B1 * | 7/2003 | Lopez | A61J 1/20 | 251/149.1 |
| 8,256,802 B2 * | 9/2012 | Werth | F16L 33/2071 | 285/243 |
| 10,159,788 B2 * | 12/2018 | Schriver | A61M 5/162 | |
| 2002/0144459 A1 * | 10/2002 | Webb | A01H 3/04 | 47/57.5 |
| 2003/0196374 A1 * | 10/2003 | Wells | A01G 7/06 | 47/57.5 |
| 2012/0266534 A1 * | 10/2012 | Barbado Montero | A01G 7/06 | 47/57.5 |
| 2015/0305253 A1 * | 10/2015 | Park | A01G 7/06 | 47/57.5 |
| 2015/0351327 A1 * | 12/2015 | Davis, Jr. | A01G 7/06 | 47/57.5 |

FOREIGN PATENT DOCUMENTS

| | | |
|---|---|---|
| KR | 2014-0010762 A | 1/2014 |
| KR | 2014-0022280 A | 2/2014 |
| KR | 2014-0124474 A | 10/2014 |

* cited by examiner

The present invention appears below in greater detail

SLOW RATE LIQUID-DISPENSING DEVICE FOR ARBORICULTURE AND VITICULTURE

CROSS REFERENCE TO RELATED APPLICATIONS

This application is a National Stage of International Application No. PCT/FR2016/000115 filed Jul. 6, 2016, claiming priority based on French Patent Application No. 15/01444 filed Jul. 8, 2015, the contents of all of which are incorporated herein by reference in their entirety.

BACKGROUND OF THE INVENTION

The present invention relates to a device for dispensing a liquid.

Numerous devices are known that dispense a liquid by means of a pipe. By way of example, this applies to the devices proposed in the following documents:

KR 2014 0124474
CN 2037 35133
KR 2014 0022280
KR 2014 0010762

All of those devices make provision for fastening by means of a cord that passes through orifices, or else by means of a suspension member.

The field of the invention is that of dispensing a liquid at a very slow rate. For this purpose, use is made of a needle and not a pipe.

The invention finds an advantageous application in the field of arboriculture and viticulture. Specifically, trees often need to be treated in order to ensure they are in good health, in particular in order to combat various diseases, to correct deficiencies, or to induce physiological responses relating to sap circuits, for example. Mention is made more particularly of vines, which are very sensitive to esca, a much-feared disease.

Concerning the treatment of trees, Document FR 2 839 851 A is known. That document proposes a device comprising a rigid container that communicates with a needle projecting to the outside of the container. The container is filled with a treatment liquid and it is fastened to the trunk of the tree by means of a strap.

The needle is inserted in an orifice previously formed in the trunk. Thus, the liquid is dispensed into the trunk at a very slow rate.

That device gives satisfaction in terms of the results obtained. Nevertheless, it requires handling operations that are expensive in terms of time. Specifically, it is necessary to place the strap around the container and to tighten it against the trunk when installing the device. It is also necessary to remove the strap and put it away when withdrawing the device. Those seemingly inconsequential operations take a considerable amount of time when it is necessary to treat a very large number of trees.

SUMMARY OF THE INVENTION

A first object of the present invention is thus to provide a liquid dispenser device that is very easy to put into place and fasten.

According to the invention, a dispenser device for dispensing a liquid comprises a container that communicates with a needle attached to its bottom, the needle projecting to the outside of said container; the device being remarkable in that the container is provided with at least one flexible tab for fastening it.

Thus, it suffices to push a staple or a drawing pin through the fastener tab while it is in contact with the trunk, or else to stick the tab adhesively to the trunk, in order to hold the container in place.

It should also be observed that the known container is rigid. It therefore comprises a large amount of material. As a result its cost is high if the device is mass produced. It follows that a second object of the present invention is to provide a dispenser device that is inexpensive.

According to an additional characteristic of the invention, the container is flexible, the tab being secure with the container.

A container that is flexible or semi-rigid contains much less material than does a container that is rigid. It is thus less expensive.

Advantageously, the needle is fastened or mounted on a base that is secured to the container.

Preferably, the base is heat sealed to the container.

In a preferred embodiment, the container is formed by a plurality of sheets that are heat sealed together at their peripheries.

Advantageously, the tab is formed by a margin of at least one of the sheets.

Preferably, the container is provided with a protuberance that is separable.

Thus, when the protuberance is cut off, the container is provided with a vent.

Furthermore, the free end of the needle is separable.

Furthermore, the container is provided with a vent.

In the preferred embodiment, when the container is arranged vertically with the needle at the bottom, the axis of the needle presents an angle of inclination with the horizontal lying in the range 0 to 45°.

BRIEF DESCRIPTION OF THE DRAWINGS

The present invention appears below in greater detail from the following description of embodiments given by way of illustration and with reference to the accompanying figures, in which:

FIG. 1A is a ¾ face view of the device of the invention;

FIG. 1B is a side view of the device;

FIG. 3A is a face view;

FIG. 3B is a section view;

Identical elements present in more than one of the figures are given the same references in each of them.

DETAILED DESCRIPTION OF THE INVENTION

Figure 1A:
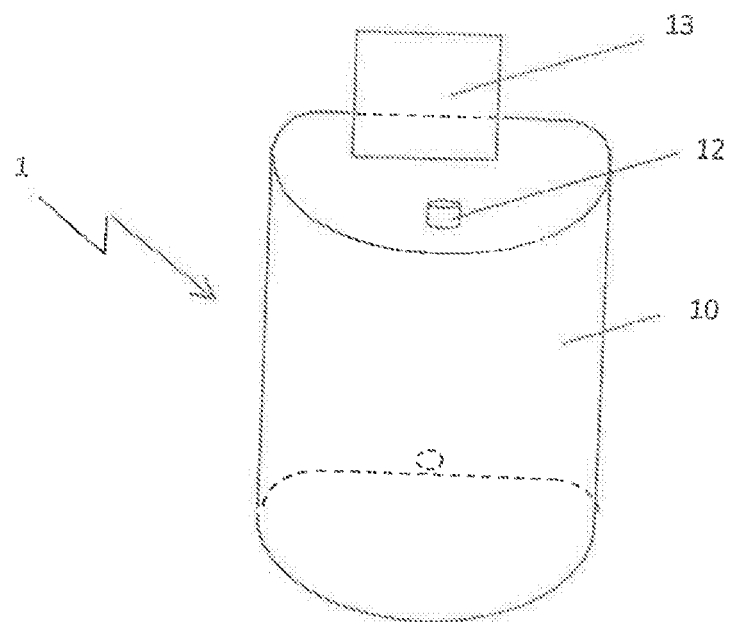
FIGS. 1A and 1B are diagrams of a first embodiment of the invention, and more particularly.
Figure 1B:
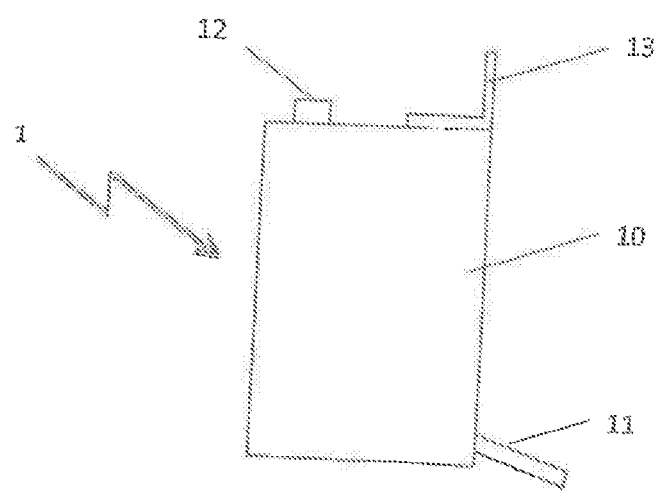

With reference to FIGS. 1A and 1B, in a first embodiment, the device 1 comprises a rigid container 10.

At the bottom of the container there can be seen a hollow needle 11 designed to be driven into the trunk of the tree for treatment, which is not shown. This needle 11 that projects to the outside of the container 10 enables the treatment liquid contained in the container to be dispensed at a very slow rate.

By way of example, the needle presents an outside diameter of 2.5 millimeters (mm) and an inside diameter of 1 mm. This is a conventional cylindrical needle of circular section. Naturally, any other shape of needle could be used for performing the invention. The term "needle" should be understood as designating a duct of relatively small inside section.

The needle 11 is fastened either in permanent manner, or else removably, e.g. by screw fastening.

There is an orifice 12 at the top of the container 10. The orifice 12 may be used for filling the container 10, in which case it may be provided with a cap (not shown). It may also be used as a vent enabling air to enter into the container 10 in order to facilitate the flow of the treatment liquid. Under such circumstances, it suffices to withdraw the cap, or indeed to provide a hole in the cap.

Likewise at the top of the container 10, there is a flexible tab 13. This tab, which thus bears against the container 10, projects from its side that is to come into contact with the trunk of the tree for treatment. This side is also the same as the side from which the needle 11 projects. The tab 13 is flexible so that it can easily be fastened to the trunk by means of a staple or a drawing pin, for example. It is also possible to envisage fastening it with adhesive that sets very quickly. It is also possible to envisage fastening it by means of a double-sided adhesive tape.

Optionally, the container 10 has two relatively long tabs suitable for being tied together around the trunk or the vine plant.

Figure 2:
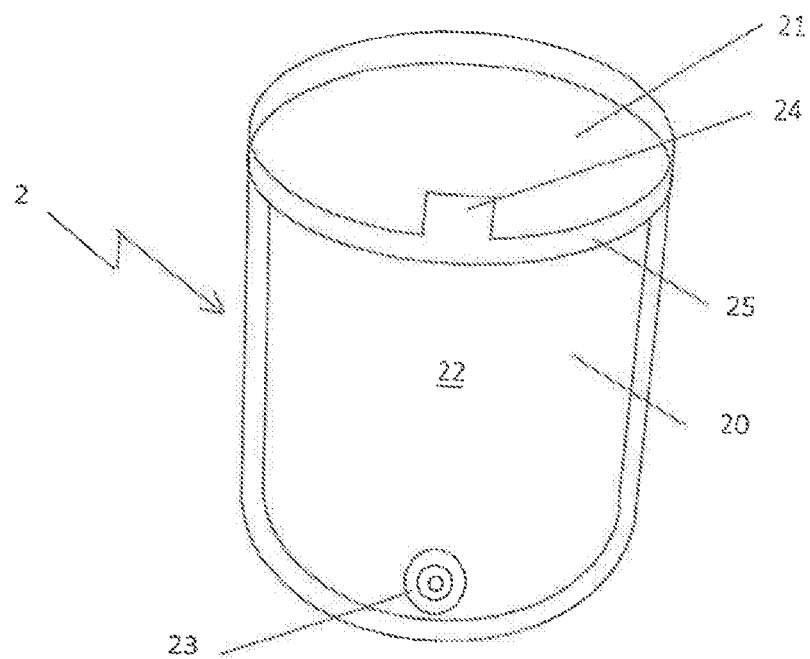
FIG. 2 is a diagram of a second embodiment of the invention in ¾ face view.

With reference to FIG. 2, in a second embodiment, the device 2 comprises a flexible container 20.

This container 20 is similar to commercially available pouches of purée.

For example, it is made by sealing together a plurality of sheets of plastic along their peripheries. The plastics material used is advantageously polyethylene.

In FIG. 2, the container 20 comprises three sheets, one sheet 21 for the top and two sheets for the side walls, only one of which 22 is visible in the figure.

Figure 3A:
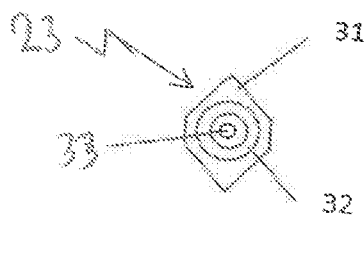
FIGS. 3A and 3B are diagrams of a base of the invention, and more particularly.

At the bottom of the container 20, opposite from its top, there is a base 23 that supports the dispenser needle, which once more projects to the outside of the container. This base 23 is shown in detail in FIGS. 3A and 3B. Advantageously, it is likewise made of polyethylene.

Still in FIG. 2, a fastener tab 24 can be seen at the top of the container 20. This tab 24 projects upwards from the container 20 so that the area for use in fastening is not too small. The tab could easily consist merely in the overlap between the top sheet 21 and the side wall 22, at the position 25 where the two sheets are heat sealed together.

Figure 3B:
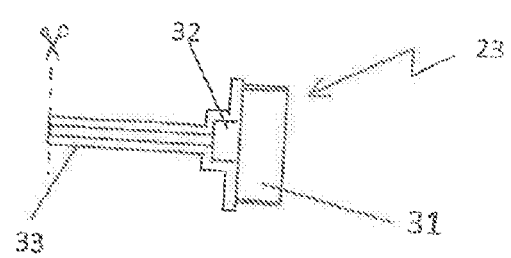

An example of a base is described with reference to FIGS. 3B and 3B. The base 23 includes a support 31. The support 31 carries a cylinder 32, and a needle 33 is mounted on the cylinder 32. The needle 33 is of the same kind as the needle described with reference to FIGS. 1A and 1B. In the present example, the axis of the needle 33 coincides with the axis of the base. Some other arrangement could nevertheless be used.

Figure 4:
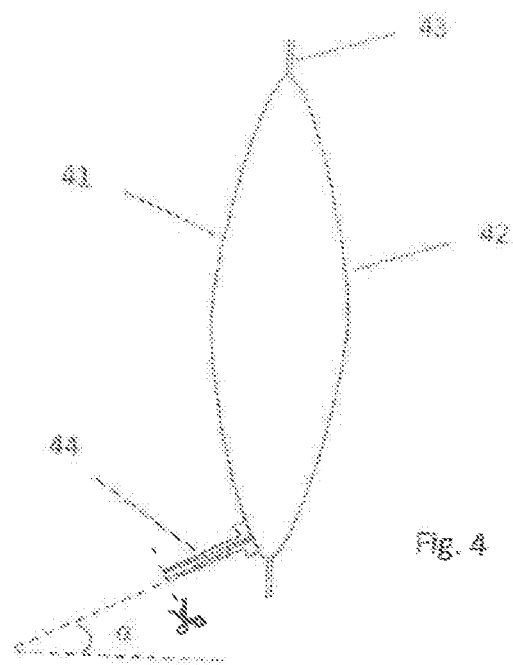
FIG. 4 is a diagram of a third embodiment of the invention in section in a profile view.

With reference to FIG. 4, the container is now constituted by only two sheets, i.e. the top sheet has been eliminated in order to retain only the two side sheets 41 and 42.

The overlap 43 between these two sheets 41 and 42 at the top of the container constitutes the fastener tab.

When the container is in its normal position of use, i.e. when it occupies a plane that is substantially vertical, the needle 44, which still projects outside the container, presents an angle of inclination α relative to the horizontal. This angle α preferably lies in the range 0 to 45°.

Figure 5:
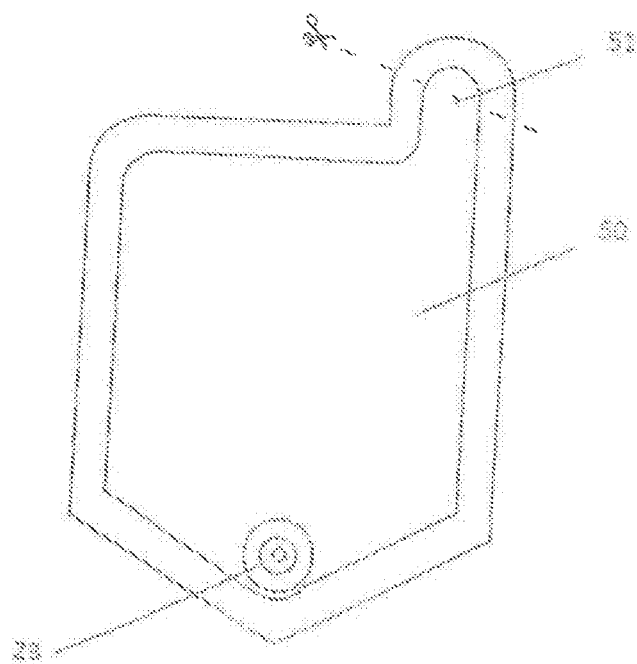
FIG. 5 is a face view of an embodiment presenting an additional characteristic.

With reference to FIG. 5, the container still comprises two sheets, and its bottom is funnel shaped. The base 23 is located at the tip of the funnel. At the top of the container 50, there is a protuberance 51 that projects from the body of the container. This protuberance can easily be cut off to provide a vent for the container 50.

Alternatively, a vent may be formed either by puncturing the container 50, or by cutting off a corner close to its top.

The container is advantageously filled in the factory prior to being completely sealed.

In order to ensure that the device is leaktight during storage and transport, the needle is closed by any means known to the person skilled in the art, or else it is advantageously separable, i.e. it is closed at its free end. It then suffices for this end to be cut or broken off, prior to putting the device into service.

Figure 6:
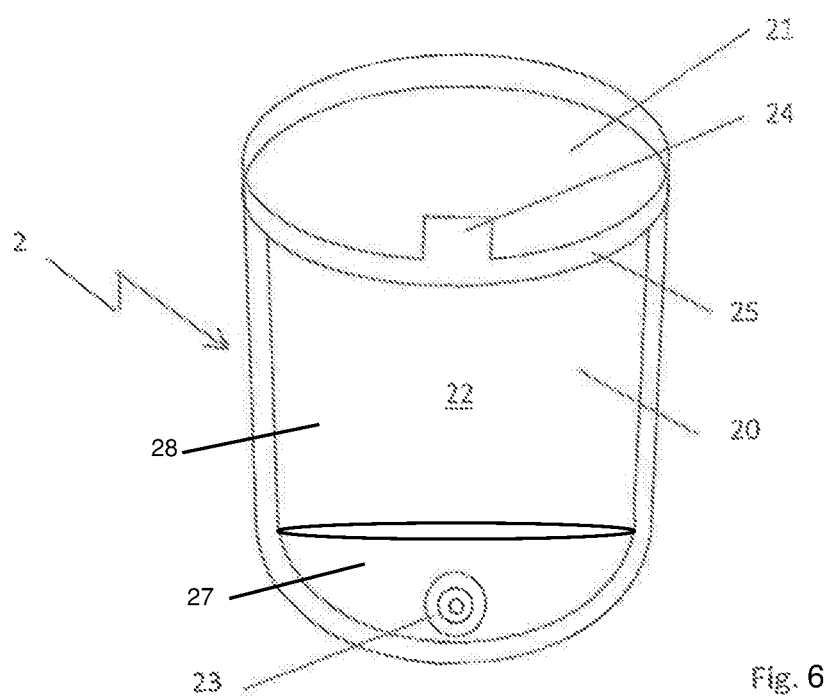
FIG. 6 is a diagram of the embodiment of FIG. 2 but wherein the container has a rigid bottom and flexible body.

Above, the container that is described is rigid or flexible. The invention is equally applicable when the container is semi-rigid. It also applies if the container is made of two or more different materials. By way of example, as shown in FIG. 6 it is possible to envisage a container 20 having a rigid bottom 27 to which the base is fixed, while its body 28 is flexible.

The device constituting the subject matter of the present invention offers numerous advantages:
  very low manufacturing cost;
  simple to industrialize;
  can be installed and removed quickly;
  fully recyclable.

The embodiments of the invention described above have been selected for their concrete nature. Nevertheless, it is not possible to list exhaustively all embodiments covered by the invention. In particular, any of the means described may be replaced by equivalent means without going beyond the ambit of the present invention.

The invention claimed is:

1. A dispenser device for dispensing a liquid into a vine plant or a trunk of a tree, the device comprising:
  a container (10, 20, 50) configured to extend substantially vertically when fastened to the vine plant or the trunk of the tree, the container comprising:
    a bottom to which a needle (11, 33, 44) is fastened so as to communicate with an inside of the container for dispensing the liquid,
    a top provided with a vent, and
    a back side extending between the top and the bottom of the container which is configured to contact the vine plant or the trunk of the tree when fastened to the vine plant or the trunk of the tree,
    wherein, when the dispenser device is fastened to the vine plant or the trunk of the tree so that the container extends along a vertical plane, the needle projects from the bottom on the backside of the container at an angle of inclination in a range of 0 to 45° with respect to a horizontal plane into an orifice in the vine plant or the trunk of the tree, and
    wherein the container is provided with at least one flexible tab (13, 24, 43) that projects from the top of the container, the flexible tab having a rear side, which is on a same side of the dispenser device as the back side of the container, the rear side of the tab configured to be fastened to the vine plant or the trunk of the tree.

2. The dispenser device according to claim 1, wherein the container (20, 41-42, 50) is flexible; and the at least one flexible tab is secured to the container.

3. The dispenser device according to claim 2, wherein the needle (33, 44) is fastened on a base (23) secured to the container (20, 41-42, 50).

4. The dispenser device according to claim 3, wherein the base (23) is heat sealed to the container (20, 41-42, 50).

5. The dispenser device according to claim 2, wherein the container (20, 41-42, 50) is formed by a plurality of sheets that are heat sealed together at peripheries of the plurality of sheets.

6. The dispenser device according to claim 5, wherein the at least one flexible tab (43) is formed by a margin of at least one of the sheets.

7. The dispenser device according to claim 2, wherein the container (50) is provided with a protuberance (51) that is separable to form the vent.

8. The dispenser device according to claim 1, wherein the container has a rigid bottom and a flexible body.

9. The dispenser device according to claim 1, wherein a free end of the needle (33, 44) is separable.

10. The dispenser device according to claim 1, wherein with the needle is fastened in permanent manner to the bottom of the container.

\* \* \* \* \*